UNITED STATES PATENT OFFICE.

PAUL ERWIN OBERREIT, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

REDUCING INDIGO COLORING-MATTERS.

999,055.          Specification of Letters Patent.     Patented July 25, 1911.

No Drawing.      Application filed June 9, 1910. Serial No. 565,939.

*To all whom it may concern:*

Be it known that I, PAUL ERWIN OBERREIT, a subject of the King of Saxony, residing at Ludwigshafen-on-the-Rhine, Germany, have invented new and useful Improvements in Reducing Indigo Coloring-Matters, of which the following is a specification.

The specification of Letters Patent No. 820,900 describes the reduction of indigo and similar coloring matters by treating them with iron powder in the presence of a caustic alkali solution containing at least 6.5 per cent. of solid caustic alkali, and the specification of Letters Patent No. 843,566 describes a modification of the aforesaid process in which a part, or the whole, of the alkali is replaced, for instance, by alkali carbonate.

I have found that the reduction of indigo coloring matters (under which term in this specification and in the claims I include indigo itself and its homologues and halogen derivatives and also indigo red and thioindigo and derivatives of these compounds) can be carried out by means of ferrous oxid and alkali, and that the reaction proceeds almost quantitatively. This result was not to be anticipated, because, when ferrous hydrate is employed in the production of indigo vats, a considerable portion of the indigo is destroyed (see Beilstein, Vol. 2, page 1623). I prefer to carry out the reduction in the presence of caustic alkali of a concentration similar to that given in the aforesaid specification of Letters Patent No. 820,900, although alkali carbonate can be used instead of caustic alkali. Instead of pure ferrous oxid, a mixture thereof with iron powder can be employed, and, if desired, the ferrous oxid, or the mixture thereof with iron powder, can be treated with acid and then washed before being used for reducing purposes. This treatment with acid is, for instance, useful when the ferrous oxid, or the mixture of ferrous oxid and iron powder, has been exposed to the air for any considerable time, as then it is liable to become covered with a layer of ferric oxid, which may hinder the reducing action of the mixture.

Any suitable mineral acid or organic acid can be used for the purpose of treating the ferrous oxid of the mixture of ferrous oxid and iron powder as hereinbefore described.

The following are examples of how my invention can be carried into practical effect, but the invention is not confined to these examples. The parts are by weight.

Example 1: Grind with water three hundred and fifty parts of ferrous oxid (obtained, for instance, by reducing ferric oxid with hydrogen at a comparatively low temperature), and then add more water so that altogether there are about four hundred parts of water present, then add three hundred and fifty parts of thirty-five per cent. caustic soda solution and heat the mixture to about seventy degrees centigrade, and introduce four hundred parts of indigo powder. When the reduction is completed, filter off any residue. The vat obtained is ready for use.

Example 2: Stir, with water, three hundred and fifty parts of a mixture containing forty per cent. of iron and sixty per cent. of ferrous oxid (obtained, for instance, by reducing ferric oxid with hydrogen at a moderate red heat), and when a thin paste has been obtained add about one hundred parts of twenty-two per cent. sulfuric acid and then filter off and wash the residue. Then add to the wet iron and ferrous oxid mixture so much water that the whole contains about four hundred parts of water, and then proceed as described in the foregoing example. The mixture obtained as described is sufficient to reduce about five hundred parts of indigo.

Example 3: Grind together one hundred parts of indigo powder, one hundred parts of crystalline sodium carbonate, and one hundred parts of ferrous oxid, and heat the whole to a temperature of from ninety to one hundred degrees centigrade, when complete reduction takes place.

Now what I claim is:—

1. The process of reducing indigo coloring matters by heating them with ferrous oxid in the presence of alkali.

2. The process of reducing indigo coloring matters by heating them with ferrous oxid in the presence of caustic alkali.

3. The process of reducing indigo coloring matters by heating with ferrous oxid in caustic alkali solution which contains at least 6.5 per cent. of solid caustic alkali.

In testimony whereof I have hereunto set my hand in the presence of two subscribing witnesses.

PAUL ERWIN OBERREIT.

Witnesses:
J. ALEC. LLOYD,
ERNEST L. IVES.